United States Patent
Gupta et al.

(10) Patent No.: US 11,629,056 B2
(45) Date of Patent: Apr. 18, 2023

(54) REACTOR FOR CARBON NANOTUBE AND NANOFIBER PRODUCTION

(71) Applicant: ExxonMobil Technology and Engineering Company, Annandale, NJ (US)

(72) Inventors: Ramesh Gupta, Berkeley Heights, NJ (US); Sumathy Raman, Annandale, NJ (US); Amrit Jalan, Bridgewater, NJ (US); Hugo S. Caram, Allentown, PA (US); David C. Dankworth, Princeton, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 195 days.

(21) Appl. No.: 17/124,113

(22) Filed: Dec. 16, 2020

(65) Prior Publication Data
US 2022/0185670 A1    Jun. 16, 2022

(51) Int. Cl.
*C01B 32/162*  (2017.01)
*B01J 6/00*    (2006.01)

(52) U.S. Cl.
CPC ............ *C01B 32/162* (2017.08); *B01J 6/008* (2013.01)

(58) Field of Classification Search
CPC ..... C01B 32/162; C01B 32/16; C01B 32/158; C01B 32/159; C01B 32/164;
(Continued)

(56) References Cited

U.S. PATENT DOCUMENTS 9,061,913 B2     6/2015  Lashmore et al.
2014/0255806 A1* 9/2014  Ganapathi ............... C01B 32/05
                                                        429/425

OTHER PUBLICATIONS

Lee et al; "Synthesis Mechanism of Carbon Nanotube Fibers Using Reactor Design Principles", Chemical Engineering Science, 2018, vol. 192, pp. 655-664.
(Continued)

*Primary Examiner* — Daniel C. McCracken
(74) *Attorney, Agent, or Firm* — Shook, Hardy & Bacon L.L.P.

(57) ABSTRACT

Systems and methods are provided for production of carbon nanotubes and $H_2$ using a reaction system configuration that is suitable for large scale production. In the reaction system, a substantial portion of the heat for the reaction can be provided by using a heated gas stream. Optionally, the heated gas stream can correspond to a heated $H_2$ gas stream. By using a heated gas stream, when the catalyst precursors for the floating catalyst-chemical vapor deposition (FC-CVD) type catalyst are added to the gas stream, the gas stream can be at a temperature of 1000° C. or more. This can reduce or minimize loss of catalyst precursor material and/or deposition of coke on sidewalls of the reactor. Additionally, a downstream portion of the reactor can include a plurality of flow channels of reduced size that are passed through a heat exchanger environment, such as a shell and tube heat exchanger. This can provide cooling of the gas flow after catalyst formation to allow for carbon nanotube formation, while also reducing the Reynolds number of the flow
(Continued)

sufficiently to provide laminar flow within the region where carbon nanotubes are formed.

20 Claims, 2 Drawing Sheets

(58) Field of Classification Search
CPC ..... C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B01J 6/008; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

OTHER PUBLICATIONS

Hata et al; "Water-Assisted Highly Efficient Synthesis of Impurity-Free Single -Walled Carbon Nanotubes", Science, 2004, vol. 306, Issue 5700, pp. 1362-1364.

Karaeva et al; "Longer Carbon Nanotubes by Controlled Catalytic Growth in The Presence of Water Vapor", Journal Fullerenes, Nanotubes and Carbon Nanostructures, 2012, vol. 20, Issue 4-7, pp. 411-418.

Windle; "Understanding the Direct Spinning of CNT Fibers in Terms of the Thermodynamic and Kinetic Landscape: A Personal View", Chapter 7 Nanotube Superfiber Materials (2nd Edition), Science, Manufacturing, Commercialization Micro and Nano Technologies, 2019, peg. 149-184.

Weller et al; "Mapping the Parameter Space for Direct-Spun Carbon Nanotube Aerogels", Carbon, 2019, vol. 146, pp. 789-812.

Zhang et al; "Carbon Nanotube Mass Production: Principles and Processes", ChemSusChem, 2011, vol. 4, pp. 864-889.

Ogihara, et al; "Pyrolysis of Mixtures of Methane and Ethane: Activation of Methane With the Aids of Radicals Generated From Ethane" Reaction Chemistry & Engineering, 2020, vol. 5, pp. 145-153.

* cited by examiner

REACTOR FOR CARBON NANOTUBE AND NANOFIBER PRODUCTION

FIELD OF THE INVENTION

This invention relates to systems and methods for production of carbon nano-scale structures, such as nanotubes or nanofibers.

BACKGROUND OF THE INVENTION

Pyrolysis of methane (or other hydrocarbons) to form hydrogen provides a pathway for converting hydrocarbons to $H_2$, a clean burning fuel, and solid carbon. In terms of $CO_2$ emissions, using pyrolysis of hydrocarbons to generate $H_2$ can potentially provide a way to reduce or minimize $CO_2$ emissions without requiring carbon capture technology to be deployed for every process that requires a fuel for combustion. However, a variety of challenges remain for implementing hydrocarbon pyrolysis for $H_2$ generation as a fuel on a commercial scale.

One of the difficulties with using pyrolysis to generate $H_2$ as a fuel is that a substantial quantity of solid carbon is also generated as a side product. Solid carbon is a relatively low value material, and if the option of using the solid carbon as a fuel for combustion is removed, the value of solid carbon is often negative (i.e., the carbon is disposed of rather than sold as a valuable product). For generation of $H_2$ by hydrocarbon pyrolysis to become a commercially viable technology, it would be desirable to have systems or methods that can allow the pyrolysis reaction to form a carbon product with a positive value rather than a negative value.

One option for forming a carbon product with a positive value is to combine the hydrocarbon pyrolysis process with a pyrolysis for carbon nanotube formation. Carbon nanotubes have a variety of commercially beneficial properties, so even a modest yield of carbon nanotubes could substantially improve the economics of a hydrocarbon pyrolysis process. However, carbon nanotube formation is currently a laboratory scale process, performed in reactors that produce on the order of grams per day of carbon nanotubes. While existing small-scale reactors could potentially be used in parallel to make larger quantities of carbon nanotubes, such a scale-up would pose substantial engineering challenges. First, a variety of complicated manifolds would likely be needed in order to manage the input flows, output $H_2$ flows, and the extraction of the carbon nanotubes. Additionally, the difficulty of simultaneously providing the heat necessary for pyrolysis to a large number of individual reactors would need to be resolved. The equipment footprint required for handling this scale-up configuration would also likely be substantial. Therefore, it would be beneficial if systems and/or methods were available that would allow for commercial scale production of carbon nanotubes and $H_2$ while avoiding the substantial engineering challenges of using a large plurality of small reactors.

U.S. Pat. No. 9,061,913 describes an apparatus for production of carbon nanotubes. The apparatus provides a method for introducing the input flows for the reaction in the form of droplets.

SUMMARY OF THE INVENTION

In various aspects, a reaction system for forming carbon nanotubes is provided. The reaction system includes a reactor comprising at least one heated gas flow inlet, a pyrolysis zone, a heat exchanger, and at least one product outlet. The reaction system further includes a heater in fluid communication with the at least one heated gas flow inlet via a heated gas flow conduit. Additionally, the reaction system includes at least one reactant flow inlet a) in direct fluid communication with the pyrolysis zone, b) in indirect fluid communication with the pyrolysis zone via the heated gas flow conduit, or c) a combination thereof, and an array of gas flow tubes within the heat exchanger, the array of gas flow tubes being in fluid communication with the pyrolysis zone and in fluid communication with the at least one product outlet. In such aspects, a ratio of an average cross-sectional area of the pyrolysis zone that is available for gas flow to an average cross-sectional area of the array of gas flow tubes can be 1.1 or more, or a ratio of an average cross-sectional of the pyrolysis zone that is available for gas flow to an average cross-sectional area of a tube in the array of gas flow tubes can be 10 or more, or a combination thereof.

In various aspects, a method for forming carbon nanotubes is provided. The method includes heating a gas flow to a temperature of 1000° C. or more to form a heated gas flow. The method further includes passing the heated gas flow into a reactor comprising a pyrolysis zone, the pyrolysis zone comprising an average cross-sectional area that is available for gas flow. The method further includes mixing a catalyst precursor flow and a hydrocarbon-containing flow with the heated gas flow to form a heated gas flow mixture, the heated gas flow mixture comprising 10 vol % or less of hydrocarbons. The method further includes maintaining the heated gas flow mixture in the pyrolysis zone at a temperature of 1000° C. or more for a pyrolysis residence time to form a product flow comprising a catalyst formed from the catalyst precursor flow, $H_2$, and carbon. The method further includes cooling the product flow to a temperature of 800° C. or less. Additionally, the method includes passing the product flow into an array of gas flow tubes within the reactor to form carbon nanotubes. In such aspects, a ratio of an average cross-sectional area of the pyrolysis zone that is available for gas flow to an average cross-sectional area of the array of gas flow tubes can be 1.1 or more, or a ratio of an average cross-sectional of the pyrolysis zone that is available for gas flow to an average cross-sectional area of a tube in the array of gas flow tubes can be 10 or more, or a combination thereof.

DETAILED DESCRIPTION OF THE EMBODIMENTS

Figure 1:
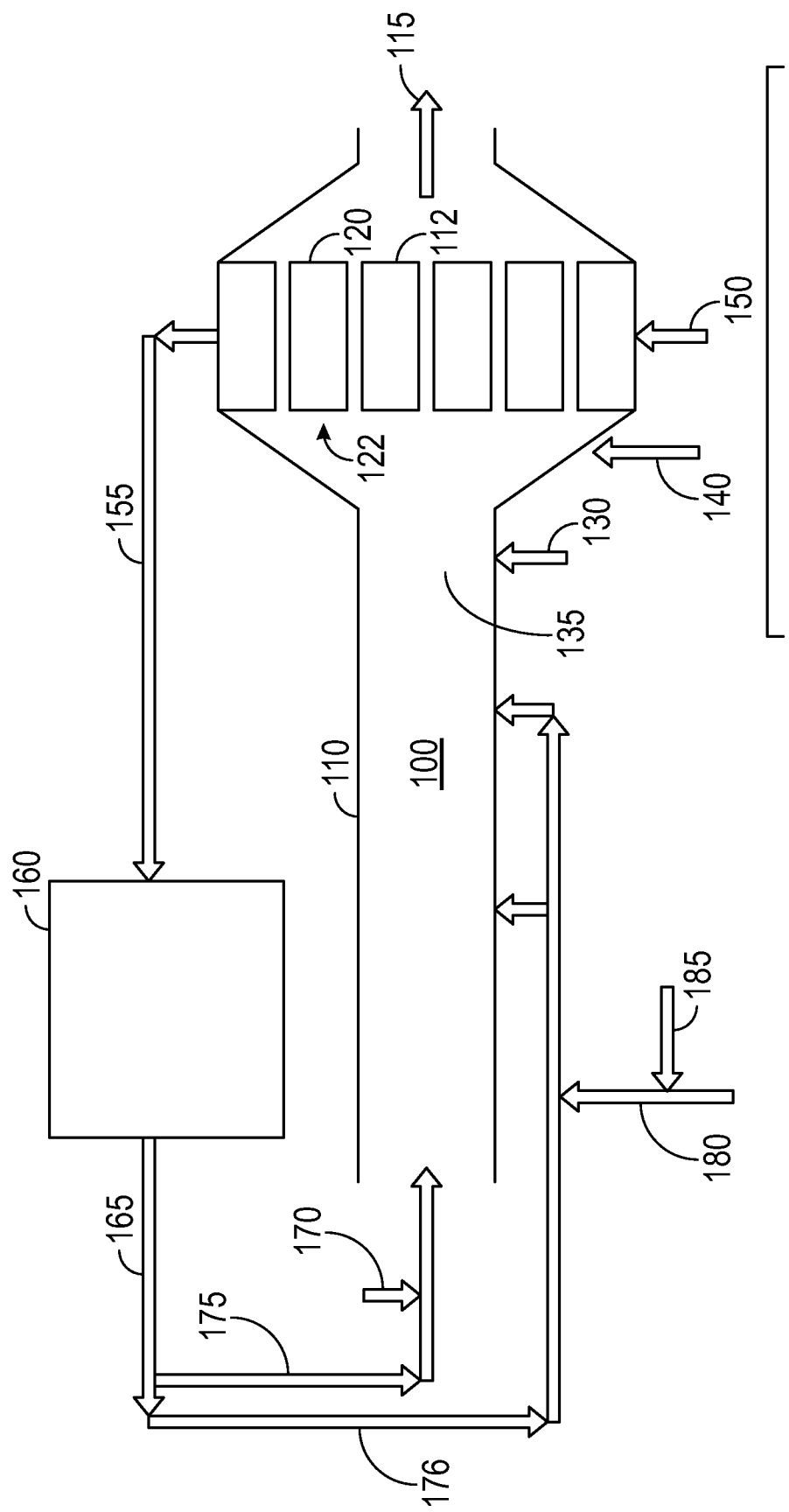
FIG. 1 shows an example of a reaction system for forming carbon nanotubes.

All numerical values within the detailed description and the claims herein are modified by "about" or "approximately" the indicated value, and take into account experimental error and variations that would be expected by a person having ordinary skill in the art.

Overview

In various aspects, systems and methods are provided for production of carbon nanotubes and $H_2$ using a reaction system configuration that is suitable for large scale production. In the reaction system, a substantial portion of the heat for the reaction can be provided by using a heated gas stream. Optionally, the heated gas stream can correspond to a heated $H_2$ gas stream. By using a heated gas stream, when the catalyst precursors for the floating catalyst-chemical vapor deposition (FC-CVD) type catalyst are added to the gas stream, the gas stream can be at a temperature of 1000° C. or more. This can reduce or minimize loss of catalyst precursor material and/or deposition of coke on sidewalls of the reactor. Additionally, a downstream portion of the reactor can include a plurality of flow channels of reduced size that are passed through a heat exchanger environment, such as a shell and tube heat exchanger. This can provide cooling of the gas flow after catalyst formation to allow for carbon nanotube formation, while also reducing the Reynolds number of the flow sufficiently to provide laminar flow within the region where carbon nanotubes are formed.

Carbon nanotubes are conventionally produced in a small scale tubular reactor. Due to the small diameter of the reactor, heating and cooling of the reactor to desired temperature ranges can be managed by heat transfer through the reactor walls. For example, in some conventional designs, the tubular reactor is placed partially within a furnace, with at least the product-side end of the reactor being outside of the furnace. This can allow the initial portions and the reaction zone of the tubular reactor to be heated to desired temperatures within the furnace to facilitate catalyst formation and methane pyrolysis. The end of the reactor can then be cooled by radiative heat transfer to the environment to cool the reactor to the desired temperature for carbon nanotube formation.

Attempting to scale up a conventional reactor for carbon nanotube production can present a variety of challenges. First, as the reactor diameter is increased, it becomes increasingly difficult (if not physically impossible) to transfer sufficient heat transfer through the reactor walls to maintain the temperatures needed for methane pyrolysis. Attempting to cool the gas flows in the reactor after pyrolysis to the temperature for carbon nanotube formation presents similar challenges, due to the limited amount of heat that can exit from the reactor via the reactor walls.

In addition to heat transfer difficulties, another challenge is that conventional reactor designs result in substantial loss of the catalytic metal for nanotube formation. For example, the FC-CVD catalyst used for carbon nanotube formation is typically formed in-situ by decomposition of appropriate precursors. Ferrocene and thiophene are examples of typical precursors for forming the FC-CVD catalyst. In a conventional reactor, the precursors are heated within the reactor along with the methane gas flow for pyrolysis. As a result, the catalyst precursors are exposed for a period of time to a temperature environment of 700° C.-900° C. During this time period, as the catalyst precursors decompose, the iron (or other metal) from the catalyst precursors has a tendency to deposit on the walls of the reactor. This can result in loss of 50 mol % or more of the iron from the catalyst precursors. Additionally, after this metal deposition begins, coke formation is also observed on the walls of conventional reactors. In a laboratory scale apparatus, daily cleaning of reactor walls can be an acceptable solution, as the low thermal mass of a small scale apparatus can allow the reactor to quickly heat up and cool down. For a large scale reactor, shutting down and restarting the reactor requires considerably more effort, and can substantially reduce the efficiency of the reactor due to lost time on service.

Still another challenge can be related to managing the gas flows within a reactor. When the catalyst precursors are introduced into the reactor, it can be desirable to have a well-mixed or turbulent flow in order to facilitate catalyst formation. However, efficient formation of carbon nanotubes at the product end of the reactor is facilitated by having a substantially laminar flow with little or no mixing. In a laboratory scale device, the initial mixing of reactants can be achieved in a variety of manners, so that the flow is well-mixed even though the amount of turbulence in the flow is reduced or minimized. In other words, reactants can be well-mixed in a small scale reactor while maintaining a Reynolds number below 1000, or even below 500. By contrast, in a larger scale reactor, creating a well-mixed flow at the beginning of the reactor will result in a turbulent gas flow with a Reynolds number greater than 5000. For efficient nanotube formation, the Reynolds number of the flow needs to be reduced to roughly 500 or less as the flow reaches the product end of the reactor.

In various aspects, a reactor, reaction system, and method of operating the reactor/reaction system are provided that can overcome the various challenges in forming carbon nanotubes in a larger scale reactor. With regard to managing addition of heat to achieve the temperature for methane (or other hydrocarbon) pyrolysis, the reactor can be heated using a heated gas flow. The gas flow can be heated to a desired temperature prior to introducing the gas flow into the reactor. The various reactants, such as methane (for pyrolysis) and catalyst precursors, can then be introduced into the gas flow at a location within the reactor or sufficiently close to the beginning of the reactor so that catalyst formation and/or methane pyrolysis occur substantially within the reactor. It is noted that after introduction of the reactants using one or more gas flows, the volume of the gas flow(s) for the reactants (e.g., methane, catalyst precursors) is on the order of a few percent relative to the combined volume of the heated gas flow and the reactants. As a result, even if the reactant gas flow(s) are not heated or only mildly heated prior to introduction into the reactor, the much larger volume of the heated gas flow can rapidly bring the reactants up to temperatures. In some aspects, the heated gas flow can correspond to a hydrogen gas flow, such as hydrogen generated by the pyrolysis process. In other aspects, at least a portion of the heated gas flow can correspond to a gas that is substantially non-reactive under the pyrolysis conditions, such as $N_2$ or Ar. Optionally, the walls of the reactor can also be heated to supplement the thermal energy of the heated gas flow.

Using a heated gas flow to heat the reactor can also provide an unexpected benefit. By heating the heated gas flow to a temperature above 1000° C. prior to entering the reactor, the gas flow is at a temperature that is above 700° C.-900° C. when the gas flow comes into contact with the catalyst precursors. Because the volume of the catalyst precursors is small relative to the volume of the heated gas flow, the catalyst precursors can be rapidly heated to a temperature of 1000° C. or more. Due to this rapid heating, the catalyst precursors pass through the temperatures of 700° C. to 900° C. on a time scale of milliseconds or less. As a result, deposition of metals from the catalyst precursors on the upstream portions of the walls of the reactor is reduced or minimized, as the catalyst precursors do not spend sufficient time at temperatures between 700° C. to 900° C. to facilitate such deposition. This has the additional benefit of also reducing or minimizing any carbon deposition, since the metal deposits that nucleate the carbon deposition are not present.

With regard to managing removal of heat after performing pyrolysis, so that the pyrolysis product and in-situ catalyst can be reacted to form carbon nanotubes, a heat exchanger can be used to reduce the temperature of the pyrolysis product gas flow. An example of a suitable heat exchanger design is a shell and tube heat exchanger. In this design, a plurality of conduits can pass through the shell of the reactor. This can reduce the temperature within the shell to a desired level for carbon nanotube formation.

With regard to flow management, the injection of the reactant flows into the reactor is performed in a manner so that flow in the initial portion of the reactor is turbulent, with a Reynolds number of 2000 or more, or 5000 or more, or 8000 or more, such as up to 20,000 or possibly still higher. This initial turbulent flow can be converted to a substantially laminar flow (with a Reynolds number of less than 2000) in a later section of the reactor based on the design of the reactor. In the zone where cooling of the flow is desired to allow for formation of carbon nanotubes, the flow can be passed into a shell and tubes heat exchanger section. The "shell" section of the heat exchanger is the portion of the heat exchanger that receives the internal reactor flow. This shell section can be divided into a large plurality of flow channels. Dividing the flow into a plurality of flow channels can provide several advantages. First, the diameter of the individual flow channels can be substantially reduced. Second, the overall cross-sectional area of the reactor available for receiving the flow can be reduced, resulting in a net increase in the flow velocity. The combination of forcing the flow into smaller tubes at a higher velocity can substantially reduce the Reynolds number of the flow, so that what was initially a turbulent flow can be converted into a plurality of laminar flow streams in the flow channels.

It is noted that calculation of a Reynolds number is a well-known procedure based on several pieces of data that are typically readily available. Equation (1) shows the calculation for determining a Reynolds number.

$$\mathrm{Re} = \frac{\rho v l}{\mu} = \frac{vl}{\nu} \quad (1)$$

In Equation (1), $\rho$ is the density of the fluid, v is the velocity of the fluid, l is the characteristic distance (in this case, the diameter of the conduit), $\mu$ is the dynamic viscosity of the fluid, and $\nu$ is the kinematic viscosity of the fluid. As shown in Equation (1), the Reynolds number can be calculated using either a dynamic or a kinematic viscosity, depending on which is more convenient to use.

In various aspects, a Reynolds number can be calculated at a convenient location within the reactor based on the following method. First, mass balance can be used to determine a flow rate within the reactor. The velocity at any given location can then be determined based on the mass flow rate, the pressure within the reactor, and the average diameter of the flow path in the reactor at the location. It is noted that in the latter portion of the reactor, the average diameter of the flow path corresponds to the diameters of the individual tubes in the shell and tube section. The average diameter also corresponds to the characteristic length "l" for Equation 1. For viscosity, the average composition of the gas flow in the reactor can be determined based on input flows. The desired viscosity for the average composition can then be determined based on standard values (and based on the temperature at a given location in the reactor). Based on a Reynolds number calculation at various locations, a mass flow rate into the reactor can be determined that allows the initial stages to have a sufficiently turbulent flow while the later stages can have a sufficiently laminar flow.

Definitions

In this discussion, a reactor is described that includes a pyrolysis section or zone and a section or zone for carbon nanotube formation. In this discussion, the beginning of the section or zone for carbon nanotube formation is defined as the location where the gas flow in the reactor enters the array of smaller diameter gas flow tubes that are located within the shell and tube heat exchanger portion of the reactor. It is noted that the smaller diameter gas flow tubes are located within the "shell" portion of the heat exchanger. The "tube" portion of the heat exchanger in this design contains a heat transfer fluid, and is not part of the gas flow path for carbon nanotube formation. The end of the pyrolysis zone is defined as either a) the beginning of the section or zone for carbon nanotube formation, or b) if one or more quench streams are introduced into the heated gas flow downstream from exposing the hydrocarbons to a temperature of 1000° C. or more but upstream from the beginning of the section or zone for carbon nanotube formation, then the location of the quench stream corresponds to the end of the pyrolysis zone. If the quench stream is introduced at multiple locations, the farthest upstream location is the end of the pyrolysis zone. It is noted that if a quench stream is present, a quench zone can be present between the end of the pyrolysis zone and the beginning of the carbon nanotube formation zone. The length of such a quench zone can be selected to control the size and/or distribution of the nucleated catalyst particles that facilitate the growth of the carbon nanotubes.

In-Situ Formation of FC-CVD Catalyst

A reaction system for carbon nanotube formation can perform at least three types of reactions. One reaction is in-situ formation of the catalyst for forming the carbon nanotubes. A second reaction is pyrolysis of methane (or another hydrocarbon) to provide $H_2$ and carbon for forming the carbon nanotubes. The third reaction is the formation of the carbon nanotubes on the re-nucleated catalyst particles that were formed in-situ. The various reactions can be managed by controlling the temperature in the various zones of the reactor.

The catalyst forming the carbon nanotubes can correspond to a floating catalyst-chemical vapor deposition (FC-CVD) type catalyst. Some examples of a suitable FC-CVD catalysts are catalysts that are formed in-situ by decomposition of appropriate precursors. For example, one option for forming an FC-CVD catalyst is to use ferrocene and thiophene precursors. Thiophene at least partially decomposes at roughly 500° C., while ferrocene decomposes at roughly 750° C. Iron sulfide and $Fe(CO)_5$ are other examples of iron-based precursors that can be used to form an FC-CVD catalyst. More generally, the FC-CVD catalyst can include iron, cobalt, and/or nickel. General examples of metal precursors can include acetylene and cyclopentadiene precursors. To form the catalyst, the precursors are decomposed and allowed to mix to form the catalyst. The mixing can be performed in any convenient manner. This can include, for example, injecting the precursor flows at an angle relative the direction of flow in the reactor to assist with mixing; inserting internal structures to help create turbulence to facilitate mixing; using various types of nozzles to disperse the precursor flows within the gas flow inside the reactor; and/or any other convenient method. The catalyst is then subsequently cooled to a temperature of roughly 600° C. to 800° C. to allow for carbon nanotube formation. In such a temperature range, the catalyst can serve as a nucleation site for formation of a carbon nanotube. It is noted that the term "catalyst" is used to describe the FC-CVD catalyst because to facilitates the formation of the carbon nanotubes. However, it is understood that at least a portion of the FC-CVD catalyst is consumed during the formation process, as at least part of the iron is incorporated into the nanotube structure.

In this discussion, the term "catalyst" is defined to include materials that function in the manner of an FC-CVD catalyst.

One of the challenges in synthesizing carbon nanotubes is managing the reactants to improve yield. For example, in a conventional reactor for carbon nanotube synthesis, a portion of the iron remains within the reactor, typically deposited on a wall or another surface in the reactor. This is because conventionally, when ferrocene is decomposed at a temperature between 700° C. and 1000° C. the resulting iron atom or iron ion that is formed has a higher phase stability as an atom deposited on a surface, as opposed to remaining in the gas phase. As a result, when a ferrocene precursor is heated through the temperature range 700° C.-1000° C., deposition of iron on exposed surfaces can occur. This deposition of iron can continue until the temperature is above 1000° C., where iron atoms have a higher phase stability in the gas phase. In a conventional system, this can result in a substantial deposition of iron on the reactor walls and thereby reduce or minimize the amount of in-situ catalyst that is formed. A similar mechanism can cause metal atoms from other types of precursors to also deposit on the reactor walls.

In addition to reducing the amount of metal available for use as a catalyst, the deposition of the metal on the reactor walls can also facilitate deposition of carbon on the reactor walls. Although pyrolysis is slower at temperatures of 800° C.-1000° C., some pyrolysis can occur (such as pyrolysis of the thiophene precursor), and it is believed that the presence of deposited iron on the reactor walls can increase the rate of carbon deposition. In addition to loss of material, the deposits can eventually require cleaning, which means shutting down the reactor and a loss of run time.

In various aspects, the above difficulties in forming the in-situ catalyst from the catalyst precursors can be reduced or minimized by decomposing the precursors in a different environment. Instead of heating a gas flow containing the precursors, the precursors can be injected into a heated gas flow that is already at a temperature of 1000° C. or more, or 1100° C. or more, or 1200° C. or more, such as up to 1600° C. or possibly still higher. The temperature of the gas flow entering the reactor can be based at least in part on the temperature that is needed to achieve a desired temperature for the hydrocarbon pyrolysis reaction. The catalyst precursor flow can be on the order of 1.0 vol % of the total gas flow or less, so that injecting the catalyst precursor flow results in only a minimal change in the temperature of the total gas flow, regardless of the temperature of the catalyst precursor flow prior to injection. By heating the gas flow prior to injecting the catalyst precursors, the catalyst precursors can decompose in a reaction environment that is already at a temperature of 1000° C. or more. In this environment, the desired FC-CVD catalyst can still form, but the likelihood of deposition of iron (or other precursor metal) on the reactor walls is reduced or minimized. Additionally, the catalyst precursor flow can be injected into a turbulent flow and/or the catalyst precursor flow can be injected in a manner to create turbulent flow, so that the catalyst precursor flow rapidly equilibrates with the temperature of the heated gas flow. Thus, any iron atoms formed from the catalyst precursor will either already be at 1000° C. or higher, or the iron atoms will be heated on the order of milliseconds or less to a temperature of 1000° C. or more. In either case, the resulting decomposition conditions can allow for catalyst formation while having a reduced or minimized tendency to cause deposition of iron atoms on reactor surfaces. Additionally, having a reaction environment that is already at a temperature of 1000° C. or more can reduce or minimize any potential formation of carbon nanotubes in the precursor decomposition zone (such as from carbon in the thiophene). Any nanotube formation that occurs at this early stage could potentially provide deposition sites for iron atoms. By avoiding this early nanotube formation, additional iron losses can be reduced or minimized.

It is noted that although the precursor decomposition is described here as a separate zone, in some aspects the flow containing the catalyst precursors can be part of a flow that introduces hydrocarbons for pyrolysis. Additionally or alternately, the flow containing the catalyst precursors can be introduced at one or more locations that are near and/or downstream from locations where hydrocarbons for pyrolysis are introduced. In such aspects, the zone for decomposition of catalyst precursors can overlap with or can even be entirely contained within the pyrolysis zone in the reactor.

In still other aspects, substantially all of the methane can be introduced into the reactor downstream from the catalyst formation zone. This can allow the FC-CVD catalyst (or other catalyst) to be present when methane pyrolysis starts to occur, so that substantial pyrolysis in the absence of the catalyst is reduced or minimized. This can increase the likelihood of carbon nanotube formation, as any methane that is pyrolyzed in the absence of the FC-CVD catalyst is more likely to result in coke formation rather than carbon nanotube formation.

Hydrocarbon Pyrolysis and Reactor Heating

Although some pyrolysis of hydrocarbons can occur at temperatures of less than 1000° C., in order to achieve more than 50% conversion (pyrolysis) of methane and/or other hydrocarbons in a reactor, the temperature in the pyrolysis environment can be 1000° C. or more, or 1100° C. or more, or 1200° C. or more, such as up to 1600° C. or possibly still higher. As noted above, this temperature can be achieved within the reactor by using a heated gas flow. Optionally, some supplemental heating of the reactor walls can also be performed. In such optional aspects, the amount of this supplemental heating can be characterized relative to the heat energy content of the heated gas flow. In this discussion, the heat energy content of the heated gas flow is defined as the amount of thermal energy required to heat the gas flow composition from 25° C. to the temperature of the heated gas flow as it enters the reactor. Based on this definition for heat energy content for the heated gas flow, the amount of heat energy added to the reactor per unit time (i.e., a power) can be determined. The average amount of thermal energy per unit time added to the reactor via heating of the sidewalls can correspond to 20% or less of the heat energy content per unit time of the heated gas flow, or 10% or less, or 5% or less, such as down to having substantially no thermal energy added to the reactor through the reactor sidewalls. In aspects where heating of the reactor walls is used, such supplemental heating can further reduce or minimize formation of deposits on the reactor walls.

In some aspects, the heated gas flow for heating the reactor can correspond to a gas flow that is substantially non-reactive relative to the catalyst precursors and the hydrocarbons for pyrolysis. Examples of substantially non-reactive gases can include $N_2$ and Ar. In other aspects, hydrogen generated by the pyrolysis process (or optionally another source of hydrogen) can be used at least in part as the heated gas flow. In such aspects, the amount of $H_2$ in the heated gas flow can be 20 vol % or more of the heated gas flow, or 40 vol % or more, or 60 vol % or more, or 80 vol % or more, such as up to having a heated gas flow that is substantially composed of hydrogen (95 vol % or more, such as up to 100 vol %). Optionally, when an $H_2$-containing gas is used, the $H_2$-containing gas can also include CO so that the $H_2$-containing gas corresponds to a synthesis gas. Synthesis gas can also optionally contain water and/or $CO_2$.

In some aspects, using an $H_2$-containing gas for the heated gas flow can provide an additional advantage for further reducing or minimizing carbon deposition within the reactor. Under pyrolysis conditions, both carbon atoms and $H_2$ are formed. The carbon atoms can have a tendency to deposit on the surfaces of the reactor. However, having an $H_2$-rich gas phase environment can reduce or minimize the tendency for the carbon atoms to deposit on a surface and/or can facilitate removing carbon atoms that might deposit on a surface. In such an environment, an increased amount of carbon can remain in the gas phase in some form until the gas flow reaches the cooler temperatures in the zone for formation of carbon nanotubes.

One option for heating the gas flow can be to use multiple heating stages. For example, an initial heating stage can correspond to a furnace used for heating reactors, such as the type of furnace used in a steam cracking reaction system. Conventional furnaces can be used to heat a gas flow, such as an $H_2$-containing gas flow, to a temperature of roughly 1000° C. or possibly higher. Additional heating to further increase the temperature to 1100° C. or more, or 1200° C. or more, can be provided by a variety of methods. One option can be to use electric heating to heat the walls of the conduit containing the gas flow. Although the reactor is of large size, the conduit for heating the gas flow prior to entering the reactor can be sized appropriately to allow for efficient heat transfer. Other options can include induction heating or plasma heating. Because pyrolysis is an endothermic process, the temperature of the gas flow can decrease as the pyrolysis reaction proceeds. Thus, it can be desirable to heat the gas flow to a temperature above 1000° C., so that a sufficient volume within the reactor will be above 1000° C. as the endothermic pyrolysis process cools the flow. Some additional pyrolysis can still occur after the flow cools to below 1000° C., but the reaction rate is slower.

Still another option can be to include electric heating elements within the gas flow. Silicon carbide is an example of a suitable material for forming an electric heating element. Examples of silicon carbide heating elements are sold under the brand name Kanthal® by Sandvik Materials Technology of Hallstahammar, Sweden. Other examples of materials that can be used to form heating elements can include, but are not limited to, Fe/Cr/Al alloys; molybdenum; tungsten; silicon carbide; and combinations thereof.

After heating the gas flow, the catalyst precursors and the hydrocarbon for pyrolysis (such as methane or natural gas) can be added into the gas flow and/or the reactor. Preferably, the catalyst precursors and hydrocarbons for pyrolysis can be added to the reactor. The volume of the flow for the hydrocarbons for pyrolysis can correspond to 10 vol % or less of the total gas volume that is passed into the reactor, or 5.0 vol % or less, or 3.0 vol % or less, such as down to 1.0 vol %, where the total gas flow includes the heated gas flow, the hydrocarbons for pyrolysis, and the flow for the catalyst precursors. The volume for the flow of the catalyst precursors can correspond to 1.0 vol % or less of the total gas flow volume into the reactor.

The methane flow (or other hydrocarbon flow) into the reactor can also be partially pre-heated in order to maintain the desired temperature within the reactor after the methane mixes with the heated gas flow. In some aspects, the methane can be pre-heated to a temperature of 200° C. to 500° C., or 200° C. to 400° C. If the catalyst precursors are mixed with the methane prior to entering the reactor, pre-heating the methane (or other hydrocarbon flow) to 500° C. or less will reduce or minimize decomposition of catalyst precursor prior to being mixed with the heated gas flow. Alternatively, if the catalyst precursor is introduced into the heated gas flow separately from the methane, the methane (or other hydrocarbon flow) can be pre-heated to 200° C. to 800° C., or 200° C. to 600° C., or 400° C. to 800° C.

In some aspects, the methane flow can be supplemented with a hydrocarbon that forms free radicals under the pyrolysis conditions. By forming free radicals, the temperature needed for methane pyrolysis can be reduced. One option can be to introduce propane and/or butane with the methane feed. Propane and butane are often available as part of a "condensate" stream at natural gas production sites. Another option can be to use a free radical precursor that provides free radicals that have a longer lifetime. Toluene is an example of a hydrocarbon that can provide stabilized free radicals within the pyrolysis environment. When additional hydrocarbons are used to provide free radicals in the pyrolysis environment, the amount of additional hydrocarbons can correspond to 0.1 mol % to 5.0 mol % of the amount of methane introduced into the reactor.

In some aspects, the hydrocarbons for pyrolysis and/or the catalyst precursors can be mixed with the heated gas flow within the reactor. In other aspects, at least one of the hydrocarbons for pyrolysis and the catalyst precursors can be mixed with the heated gas flow prior to entering the reactor. Optionally, a portion of the heated gas flow and/or a portion of the hydrocarbons for pyrolysis can be introduced into the reactor at a downstream location in the reactor relative to the direction of flow. Introducing different portions of the gas flow at different locations within the reactor can assist with managing the reaction profile in the reactor. For example, by adding a portion of the methane at a downstream location in the reactor, the amount of methane available for pyrolysis in the early parts of the reactor can be reduced or minimized, to further reduce the likelihood of early carbon nanotube formation and/or early deposition of carbon on the surfaces of the reactor.

It is noted that the velocity of the gas within the reactor can be relatively high. The velocity within the reactor can determine the residence time of the reactants within the pyrolysis zone. By using a high velocity in combination with a low concentration of hydrocarbons in the total flow (roughly 10 vol % or less) and a temperature greater than 1000° C., a high level of conversion can be achieved while having a low residence time. Having a low residence time in the pyrolysis zone of the reactor can reduce or minimize carbon deposition on surfaces in the reactor prior to the products reaching the zone for carbon nanotube formation. Additionally, because turbulence is desirable in the early portion of the reactor to facilitate formation of the in-situ FC-CVD catalyst, having a relatively high velocity can reduce or minimize the likelihood of any portions of the flow staying in the pyrolysis zone for an extended period of time due to back-mixing. In various aspects, the average residence time for the heated gas flow in the pyrolysis zone can range from 0.05 seconds to 5.0 seconds, or 0.05 seconds to 1.0 seconds, or 0.1 seconds to 5.0 seconds.

Creating a Cooled, Laminar Flow for Carbon Nanotube Formation

After the pyrolysis zone in the reactor, the gas flow containing the carrier gas (possibly $H_2$), pyrolysis products (including carbon atoms) and the catalyst for forming the carbon nanotubes can have a Reynolds number of 2000 or more, or 4000 or more, such as up to 20,000 or possibly still higher. This indicates a turbulent flow. The temperature can also still be close to the pyrolysis temperature of 800° C. or more, or 900° C. or more, or 1000° C. or more. In order to form carbon nanotubes in an effective manner, the temperature of the gas flow can be reduced to 750° C. or less, or 700° C. or less, and the Reynolds number of the flow can be reduced to less than 2000, so that the gas flow has laminar flow properties.

One option for cooling the gas flow can be to configure the carbon nanotube zone of the reactor as a shell and tube heat exchanger. In the shell and tube heat exchanger, the gas flow enters the "shell" portion of the heat exchanger. A heat transfer fluid is passed through the tubes to allow for rapid cooling of the gas flow containing the carrier gas, the pyrolysis products, and the catalyst for carbon nanotube formation. This can allow the gas flow to be cooled to a temperature that facilitates carbon nanotube formation, such as a temperature of 600° C. to 800° C. Additionally, within the heat exchanger, a temperature gradient can be present, so that the gas flow continues to cool as the gas travels within the heat exchanger. Due to this variation, the temperature at the beginning of the array of tubes can be between 600° C. to 800° C., while the temperature toward the end of the array of tubes can be lower by 10° C. to 150° C., or 50° C. to 150° C., or 10° C. to 100° C., or 50° C. to 100° C.

In some aspects, further cooling can be performed by adding a quench stream to the gas flow. The quench stream can correspond to $H_2$, $CH_4$, or another convenient stream. Preferably the quench stream can include a reduced or minimized amount of $H_2O$. Addition of a quench stream can assist with cooling the gas flow to a desired temperature for nanotube production.

In aspects where a quench stream is used, at a downstream location, a steam stream can be injected. Adding steam after the temperature of the gas flow is reduced to 800° C. or less, or 750° C. or less, can allow for gasification of amorphous carbon while having only minimal impact on any nanotubes. It is believed that amorphous carbon can be gasified in the presence of steam at temperatures of 700° C. or higher. By contrast, it is believed that temperatures of 900° C. or higher are needed to gasify carbon nanotubes using steam. Addition of steam to gasify amorphous carbon can provide several benefits. First, amorphous carbon that has formed on catalyst particles can be removed, thus providing additional clean nucleation sites for formation of additional carbon nanotubes. Additionally, to the degree that amorphous carbon may have formed as part of a carbon nanotube structure, such amorphous carbon can be removed. This can allow for production of carbon nanotubes with improved morphology.

In addition to cooling the gas flow, the turbulence of the gas flow can also be sufficiently reduced to provide a laminar flow. This can correspond to having a Reynolds number of less than 2000, or 1950 or less, or 1500 or less, or 1000 or less, or 600 or less, such as down to a Reynolds number of 1. The turbulence can be reduced by providing an array of smaller flow tubes within the shell portion of the heat exchanger for receiving the gas flow. Using an array of smaller flow tubes can provide two separate methods for reducing the turbulence in the gas flow. First, passing a gas flow from a larger diameter volume into a smaller diameter volume can reduce the turbulence of the flow. Second, the cross-sectional area for flow of the flow tube array can be smaller than the cross-sectional area of the pyrolysis section of the reactor. This reduction in cross-sectional area means that the velocity of the gas flow will increase, since the net flow rate within the reactor is not changed. By increasing the velocity while decreasing the diameter of the individual conduits that the gas flow is passing through, a substantial decrease in Reynolds number can be achieved.

With regard to tube size, an individual tube in the flow tube array can have a diameter that is smaller than the pyrolysis reactor diameter. A ratio of the average cross-sectional area in the pyrolysis section of the reactor that is available for gas flow versus the average diameter of the individual tubes in the flow tube array can be 10 or more (i.e., 10:1 or more), or 20 or more, or 30 or more, such as up to 100 or possibly still larger. With regard to available cross-sectional area, a ratio of the average cross-sectional area of the pyrolysis section of the reactor available for gas flow versus the average cross-sectional of the flow tube array that is available for gas flow can be 1.1 or more (i.e., 1.1:1 or more), or 1.5 or more, or 2.0 or more, or 3.0 or more, such as up to 10 or possibly still higher. It is noted that the increase in gas velocity will be substantially similar to the ratio of the cross-sectional areas that are available for gas flow. In this discussion, the cross-sectional area available for gas flow at a location refers to the portion of the total cross-sectional area of a conduit or reactor that is open to gas flow and that is in fluid communication with the volume containing the gas flow. Any internal structures within a reactor correspond to cross-sectional area/volume that is not available for gas flow.

It is noted that the total cross-sectional area of the shell and tube heat exchanger portion of the reactor may be greater than the pyrolysis zone of the reactor. However, since the gas flow is being passed into the array of flow tubes within the shell and tube heat exchanger, the cross-sectional area of the shell and tube heat exchanger is not as critical for the overall configuration.

After passing through the flow tube array, the products from the carbon nanotube formation process can be collected. In this final product recovery area, the flow exiting the reactor can be cooled to a temperature of roughly 100° C. or less. Hydrogen formed by the pyrolysis reaction can be withdrawn as a gas phase product, along with any hydrogen that was initially present in the heated gas flow. The carbon nanotubes can be recovered in any convenient manner. For example, the carbon nanotubes can form an aerogel, and a spinning process can be used to draw out a macroscopic scale carbon fibers. As another example, a conveyor belt with a support or collection matrix can be provided in the carbon nanotube formation zone. The nanotubes can deposit on the collection matrix, which is then carried out of the nanotube formation zone by the conveyor belt. The carbon nanotubes can then be recovered from the collection matrix, such as by scraping. A portion of the iron can be incorporated into the carbon nanotubes. Any excess iron can form deposits in the product recovery area.

With regard to yields, 90 vol % or more (or 95 vol % or more, such as up to 100 vol %) of the hydrocarbons introduced into the reactor can be converted into carbon and $H_2$. For the carbon formed by pyrolysis, 90 mol % or more of the carbon atoms can be passed into the product recovery area. For the iron in the ferrocene catalyst, 50 wt % or more (or 65 wt % or more, or 75 wt % or more, such as up to 100 wt % of the iron can be passed into the product recovery area, either in the form of iron within the carbon nanotubes or a bulk iron-containing phase in the product recovery area.

Configuration Example

FIG. 1 shows an example of a reaction system for carbon nanotube formation. In FIG. 1, a reactor 100 corresponds to a reactor for forming carbon nanotubes. Reactor 100 can include a pyrolysis zone or section 110 and a carbon nanotube formation zone or section 120. During operation, a heated gas flow 175 can be introduced into the beginning of the pyrolysis zone 110 of reactor 100 via a heated gas flow conduit. The heated gas flow 175 can have a temperature of 1000° C. or more, or 1100° C. or more, or 1200° C. or more. A reactant flow 170 can be added to the heated gas flow 175 prior to entering the reactor 100 (i.e., in the heated gas flow conduit) or after entering the reactor 100. In the example shown in FIG. 1, reactant flow 170 includes both the catalyst precursors for the carbon nanotube formation catalyst and a portion of the hydrocarbon for pyrolysis. Alternatively, the catalyst precursors and the hydrocarbons for pyrolysis can be introduced as separate flows. Optionally, the secondary heated gas flow 176 can be used to introduce hydrocarbons 180 for pyrolysis at a downstream location within the pyrolysis zone 110. In some aspects, substantially all of the hydrocarbons introduced into the reactor can be included as part of secondary heated gas flow 176. In some aspects, an additional hydrocarbon flow 185 for generating free radicals in the reactor can be added to hydrocarbons 180.

After entering the reactor, the reactants in the heated gas flow can react. The catalyst precursors can react to form a catalyst for carbon nanotube formation. The hydrocarbons can be pyrolyzed to form $H_2$ and carbon atoms. These can be carried by the gas flow within reactor 100 from pyrolysis zone 110 to carbon nanotube formation zone 120. In the example shown in FIG. 1, a quench stream 130 is introduced to cool the gas flow prior to entering carbon nanotube formation zone 120. In this example, the location of quench stream 130 defines the end of pyrolysis zone 110 and the beginning of a quench zone 135. Optionally, steam 140 can be introduced after quench stream 130 to assist with gasifying amorphous carbon present in the gas flow.

In the example shown in FIG. 1, the carbon nanotube zone 120 corresponds to at least a portion of the shell of a shell and tube heat exchanger. The tubes 122 of the shell and tube heat exchanger include a heat transport fluid 150 for cooling the gas flow within the carbon nanotube formation zone to a temperature of 800° C. or less. In the example shown in FIG. 1, the heat transport fluid 150 can be the gas used in the heated gas flow 175, such as nitrogen and/or hydrogen. For example, when hydrogen is used as the gas for the heated gas flow 175, using hydrogen as the heat transport fluid 150 can allow the hydrogen to be heated to a temperature between 500° C. and 700° C. to form partially heated hydrogen 155. Optionally, the hydrogen used for heat transport fluid 150 can correspond to hydrogen recovered from the products 115. The partially heated hydrogen 155 can then be passed into a heater 160 to form heated hydrogen 165. The heated hydrogen 165 can then be used to form heated gas flow 175 and optional secondary heated gas flow 176.

As an alternative to the type of configuration shown in FIG. 1, in some aspects, the heat transfer fluid of a heat exchanger can be used to provide the recovered thermal energy to raise steam and/or generate power.

In the example shown in FIG. 1, the array of tubes for reducing the turbulence of the gas flow can correspond to tubes 112 that are interspersed between the tubes 122 of the shell and tube heat exchanger. After passing through the tubes, various products 115 can exit from the reactor. The products 115 can include $H_2$ formed during pyrolysis, carbon nanotubes, the gas from heated gas flow 175 that has passed through the reactor 110, and unreacted hydrocarbons.

It is noted that the elements shown in FIG. 1 can also be described with regard to the ability for fluids to pass from one element to the next. Such fluid communication between elements in a reaction system and/or within a reactor is defined as the ability for fluids to pass from a first element to a second element. Fluid communication can correspond to direct fluid communication or indirect fluid communication. In the example shown in FIG. 1, pyrolysis zone 110 is in direct fluid communication with quench zone 135. Pyrolysis zone 110 is in indirect fluid communication with the array of tubes 112 via quench zone 135.

Figure 2:
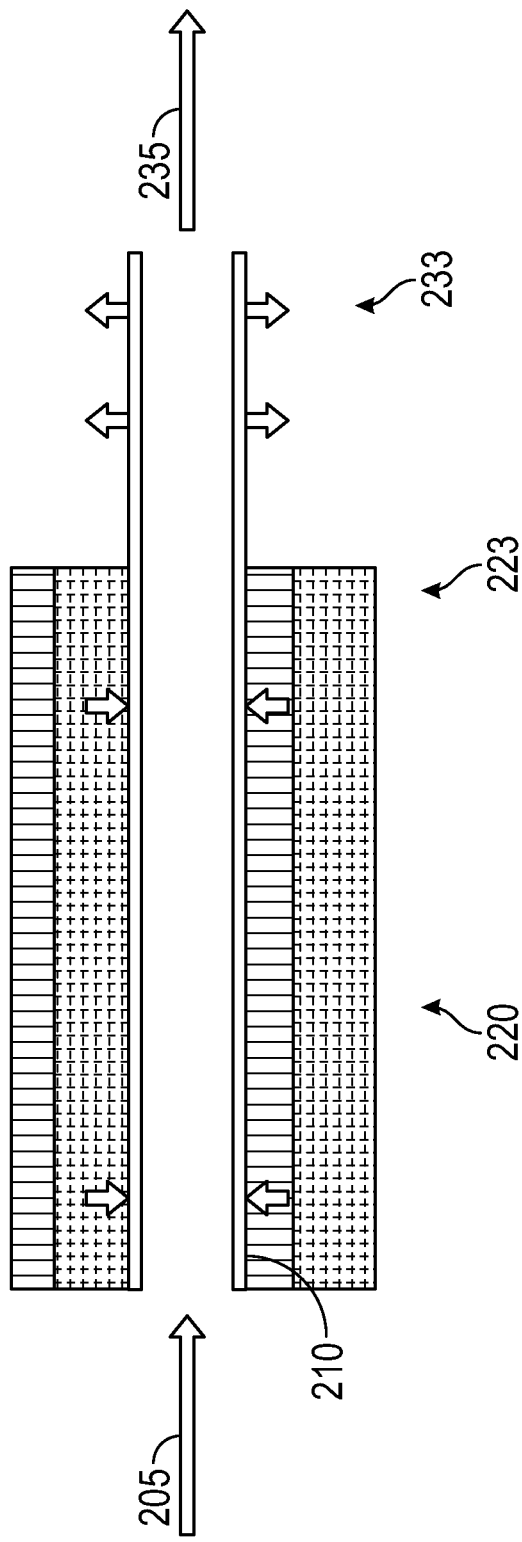
FIG. 2 shows an alternative system for forming carbon nanotubes.

The configuration example shown in FIG. 1 is in contrast to a configuration where the heating of the reactor is performed primarily by passing heat through the walls of the reactor. FIG. 2 shows an example of a comparative configuration. In FIG. 2, an input flow 205 is passed into a reactor 210. Reactor 210 can be, for example, a ceramic reactor so that heat can be transferred through the walls of the reactor. At least a first portion of reactor 210 is located within furnace 220, while a second portion of reactor 210 is outside of furnace 220.

During operation, the input gas flow 205 is passed into the front end of reactor 210. This heats the gas flow from a temperature below 500° C. up to a temperature suitable for pyrolysis. The temperature of the gas flow in the reactor 210 is maintained until the gas flow reaches the portion of reactor 210 that is outside of furnace 220. Prior to this location, heat 222 is added to reactor 210 by the furnace 220. After this location, the reactor 210 is outside of furnace 220, so heat exits 232 from the sidewalls of the reactor. This allows the reactor to cool down to facilitate carbon nanotube formation in products 235.

Additional Embodiments

Embodiment 1. A reaction system for forming carbon nanotubes, comprising: a reactor comprising at least one heated gas flow inlet, a pyrolysis zone, a heat exchanger, and at least one product outlet; a heater in fluid communication with the at least one heated gas flow inlet via a heated gas flow conduit; at least one reactant flow inlet a) in direct fluid communication with the pyrolysis zone, b) in indirect fluid communication with the pyrolysis zone via the heated gas flow conduit, or c) a combination thereof; and an array of gas flow tubes within the heat exchanger, the array of gas flow tubes being in fluid communication with the pyrolysis zone and in fluid communication with the at least one product outlet, wherein a ratio of an average cross-sectional area of the pyrolysis zone that is available for gas flow to an average cross-sectional area of the array of gas flow tubes is 1.1 or more, or wherein a ratio of an average cross-sectional of the pyrolysis zone that is available for gas flow to an average cross-sectional area of a tube in the array of gas flow tubes is 10 or more, or a combination thereof.

Embodiment 2. The reaction system of any of the above embodiments, wherein the heat exchanger comprises one or more heat transfer fluid tubes, the one or more heat transfer fluid tubes being in fluid communication with the heated gas flow inlet via the heater.

Embodiment 3. The reaction system of any of the above embodiments, wherein the heat exchanger comprises a shell and tube heat exchanger, the array of gas flow tubes being located in the shell of the shell and tube heat exchanger.

Embodiment 4. The reaction system of any of the above embodiments, further comprising a quench inlet at the end of the pyrolysis zone, the pyrolysis zone optionally being in fluid communication with the array of gas flow tubes via a quench zone.

Embodiment 5. The reaction system of any of the above embodiments, further comprising a steam inlet at a location downstream from the quench inlet.

Embodiment 6. The reaction system of any of the above embodiments, wherein the pyrolysis zone further comprises at least one internal mixing structure; or wherein the reactor comprises a plurality of gas flow inlets, a first gas flow inlet being upstream, relative to a direction of flow in the reactor, from at least one additional gas flow inlet; or a combination thereof.

Embodiment 7. The reaction system of any of the above embodiments, wherein a ratio of an average cross-sectional area of the pyrolysis zone that is available for gas flow to an average cross-sectional area of the array of gas flow tubes is 2.0 or more, or wherein a ratio of an average cross-sectional of the pyrolysis zone that is available for gas flow to an average cross-sectional area of a tube in the array of gas flow tubes is 20 or more, or a combination thereof.

Embodiment 8. A method for forming carbon nanotubes, comprising: heating a gas flow to a temperature of 1000° C. or more to form a heated gas flow; passing the heated gas flow into a reactor comprising a pyrolysis zone, the pyrolysis zone comprising an average cross-sectional area that is available for gas flow; mixing a catalyst precursor flow and a hydrocarbon-containing flow with the heated gas flow to form a heated gas flow mixture, the heated gas flow mixture comprising 10 vol % or less of hydrocarbons; maintaining the heated gas flow mixture in the pyrolysis zone at a temperature of 1000° C. or more for a pyrolysis residence time to form a product flow comprising a catalyst formed from the catalyst precursor flow, $H_2$, and carbon; cooling the product flow to a temperature of 800° C. or less; and passing the product flow into an array of gas flow tubes within the reactor to form carbon nanotubes, wherein a ratio of an average cross-sectional area of the pyrolysis zone that is available for gas flow to an average cross-sectional area of the array of gas flow tubes is 1.1 or more, or wherein a ratio of an average cross-sectional of the pyrolysis zone that is available for gas flow to an average cross-sectional area of a tube in the array of gas flow tubes is 10 or more, or a combination thereof.

Embodiment 9. The method of Embodiment 8, further comprising separating at least a portion of the $H_2$ from the product flow.

Embodiment 10. The method of Embodiment 8 or 9, wherein the heated gas flow comprises 80 vol % or more of $H_2$, or wherein the heated gas flow further comprises CO, or wherein the product flow further comprises CO, or a combination thereof.

Embodiment 11. The method of any of Embodiments 8 to 10, wherein at least a portion of the hydrocarbon-containing flow is mixed with the heated gas flow after entering the reactor; or wherein the catalyst precursor flow and the hydrocarbon-containing flow comprise a single flow; or a combination thereof.

Embodiment 12. The method of any of Embodiments 8 to 11, i) wherein cooling the product flow to a temperature of 800° C. or less comprises passing the product flow into a shell and tube heat exchanger, the array of tubes being located within the shell and tube heat exchanger, the shell and tube heat exchanger optionally further comprising heat exchanger tubes, and optionally wherein at least a portion of the gas flow comprises a heat transfer fluid that is passed through the optional heat exchanger tubes Embodiment 13. The method of any of Embodiments 8 to 12, wherein cooling the product flow is at least partially performed after passing the product flow into the array of gas flow tubes; or wherein cooling the product flow further comprises adding a quench stream to the product flow prior to passing the product flow into the array of tubes, the method optionally further comprising adding steam to the product flow after adding the quench stream; or a combination thereof.

Embodiment 14. The method of any of Embodiments 8 to 13, a) wherein the catalyst precursor flow comprises a catalyst precursor for a FC-CVD catalyst comprising iron, cobalt, nickel, or a combination thereof; b) wherein the catalyst precursor flow comprises a catalyst precursor for a FC-CVD catalyst comprising at least one of CO and pentadiene, or a combination thereof; c) wherein the hydrocarbon-containing flow comprises methane, natural gas, or a combination thereof; d) wherein the hydrocarbon-containing flow further comprises one or more hydrocarbons for forming free radicals under the pyrolysis conditions; or e) a combination of two or more of a), b), c) and d).

Embodiment 15. The method of any of Embodiments 8 to 14, wherein the gas flow is heated to a temperature of 1200° C. or more to form the heated gas flow.

Additional Embodiment A. The method of any of Embodiments 8 to 15, wherein the method is performed in a reaction system according to any of Embodiments 1 to 7.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A reaction system for forming carbon nanotubes, comprising:
a reactor comprising at least one heated gas flow inlet, a pyrolysis zone, a heat exchanger, and at least one product outlet;
a heater in fluid communication with the at least one heated gas flow inlet via a heated gas flow conduit;
at least one reactant flow inlet a) in direct fluid communication with the pyrolysis zone, b) in indirect fluid communication with the pyrolysis zone via the heated gas flow conduit, or c) a combination thereof; and
an array of gas flow tubes within the heat exchanger, the array of gas flow tubes being in fluid communication with the pyrolysis zone and in fluid communication with the at least one product outlet,
wherein a ratio of an average cross-sectional area of the pyrolysis zone that is available for gas flow to an average cross-sectional area of the array of gas flow tubes is 1.1 or more, or wherein a ratio of an average cross-sectional of the pyrolysis zone that is available for gas flow to an average cross-sectional area of a tube in the array of gas flow tubes is 10 or more, or a combination thereof.

2. The reaction system of claim 1, wherein the heat exchanger comprises one or more heat transfer fluid tubes, the one or more heat transfer fluid tubes being in fluid communication with the heated gas flow inlet via the heater.

3. The reaction system of claim 1, wherein the heat exchanger comprises a shell and tube heat exchanger, the array of gas flow tubes being located in the shell of the shell and tube heat exchanger.

4. The reaction system of claim 1, further comprising a quench inlet at the end of the pyrolysis zone.

5. The reaction system of claim 4, further comprising a steam inlet downstream from the quench inlet.

6. The reaction system of claim 1, wherein the heated gas flow conduit comprises a gas flow at a temperature of 1000° C. or more.

7. The reaction system of claim 1, wherein the pyrolysis zone further comprises at least one internal mixing structure.

8. The reaction system of claim 1, wherein the reactor comprises a plurality of gas flow inlets, a first gas flow inlet being upstream, relative to a direction of flow in the reactor, from at least one additional gas flow inlet.

9. The reaction system of claim 1, wherein a ratio of an average cross-sectional area of the pyrolysis zone that is available for gas flow to an average cross-sectional area of the array of gas flow tubes is 2.0 or more, or wherein a ratio of an average cross-sectional of the pyrolysis zone that is available for gas flow to an average cross-sectional area of a tube in the array of gas flow tubes is 20 or more, or a combination thereof.

10. A method for forming carbon nanotubes, comprising:
heating a gas flow to a temperature of 1000° C. or more to form a heated gas flow;
passing the heated gas flow into a reactor comprising a pyrolysis zone, the pyrolysis zone comprising an average cross-sectional area that is available for gas flow;
mixing a catalyst precursor flow and a hydrocarbon-containing flow with the heated gas flow to form a heated gas flow mixture, the heated gas flow mixture comprising 10 vol % or less of hydrocarbons;
maintaining the heated gas flow mixture in the pyrolysis zone at a temperature of 1000° C. or more for a pyrolysis residence time to form a product flow comprising a catalyst formed from the catalyst precursor flow, $H_2$, and carbon;
cooling the product flow to a temperature of 800° C. or less; and
passing the product flow into an array of gas flow tubes within the reactor to form carbon nanotubes,
wherein a ratio of an average cross-sectional area of the pyrolysis zone that is available for gas flow to an average cross-sectional area of the array of gas flow tubes is 1.1 or more, or wherein a ratio of an average cross-sectional of the pyrolysis zone that is available for gas flow to an average cross-sectional area of a tube in the array of gas flow tubes is 10 or more, or a combination thereof.

11. The method of claim 10, further comprising separating at least a portion of the $H_2$ from the product flow.

12. The method of claim 10, wherein the heated gas flow comprises 80 vol % or more of $H_2$, or wherein the heated gas flow further comprises CO, or wherein the product flow further comprises CO, or a combination thereof.

13. The method of claim 10, wherein at least a portion of the hydrocarbon-containing flow is mixed with the heated gas flow after entering the reactor, or wherein substantially all of the hydrocarbon-containing flow is mixed with the heated gas flow after entering the reactor.

14. The method of claim 10, wherein cooling the product flow to a temperature of 800° C. or less comprises passing the product flow into a shell and tube heat exchanger, the array of tubes being located within the shell and tube heat exchanger.

15. The method of claim 14, wherein the shell and tube heat exchanger further comprises heat exchanger tubes, and wherein at least a portion of the gas flow comprises a heat transfer fluid that is passed through the heat exchanger tubes.

16. The method of claim 10, wherein cooling the product flow is at least partially performed after passing the product flow into the array of gas flow tubes.

17. The method of claim 10, wherein cooling the product flow further comprises adding a quench stream to the product flow prior to passing the product flow into the array of tubes.

18. The method of claim 17, further comprising adding steam to the product flow after adding the quench stream to the product flow.

19. The method of claim 10, wherein the catalyst precursor flow comprises a catalyst precursor for a FC-CVD catalyst comprising iron, cobalt, nickel, or a combination thereof, or wherein the catalyst precursor flow comprises a catalyst precursor for a FC-CVD catalyst comprising at least one of CO and pentadiene, or a combination thereof.

20. The method of claim 10, wherein the hydrocarbon-containing flow further comprises one or more hydrocarbons for forming free radicals under the pyrolysis conditions.

* * * * *